(12) United States Patent
Jahnke

(10) Patent No.: US 10,268,856 B1
(45) Date of Patent: Apr. 23, 2019

(54) OUTDOOR SCANNER ENCLOSURE

(71) Applicant: HUZZARD CONSULTING, LLC, Appleton, WI (US)

(72) Inventor: Gary A Jahnke, Appleton, WI (US)

(73) Assignee: HUZZAARD CONSULTING, LLC, Appleton, WI (US)

( * ) Notice: Subject to any disclaimer, the term of this patent is extended or adjusted under 35 U.S.C. 154(b) by 0 days.

(21) Appl. No.: 15/950,662

(22) Filed: Apr. 11, 2018

(51) Int. Cl.
*G06K 7/14* (2006.01)

(52) U.S. Cl.
CPC .................. *G06K 7/1413* (2013.01)

(58) Field of Classification Search
CPC .................................................. G06K 7/1413
USPC ........................................................ 235/439
See application file for complete search history.

(56) References Cited

U.S. PATENT DOCUMENTS

| 6,065,728 | A | 5/2000 | Spradlin |
| 6,273,337 | B1 * | 8/2001 | Detwiler ............ G06K 7/10702 235/462.32 |
| 6,279,768 | B1 * | 8/2001 | Mendoza ................. H02G 3/10 220/3.8 |
| 7,942,331 | B2 | 5/2011 | Hayakawa |
| 9,070,007 | B2 | 6/2015 | Mistkawi et al. |

FOREIGN PATENT DOCUMENTS

CN          202422148          9/2012

OTHER PUBLICATIONS

"Guide to DualBeam Barcode Reader Systems From Barcode Automation, inc", Aug. 10, 2012 (Year: 2012).*

* cited by examiner

*Primary Examiner* — Seung H Lee
(74) *Attorney, Agent, or Firm* — Ryan Kromholz & Manion, S.C.

(57) ABSTRACT

Disclosed is an outdoor scanner enclosure designed to advantageously mount and protect a scanner. The enclosure includes an interior mounting structure that orients the scanner to allow for reading scan codes on mobile devices of different sizes and presented in multiple orientations, as well as scan codes placed on other media such as cards or paper printouts. The scanner enclosure is constructed to prevent ingress of environmental elements that may be deleterious to the scanner.

3 Claims, 5 Drawing Sheets

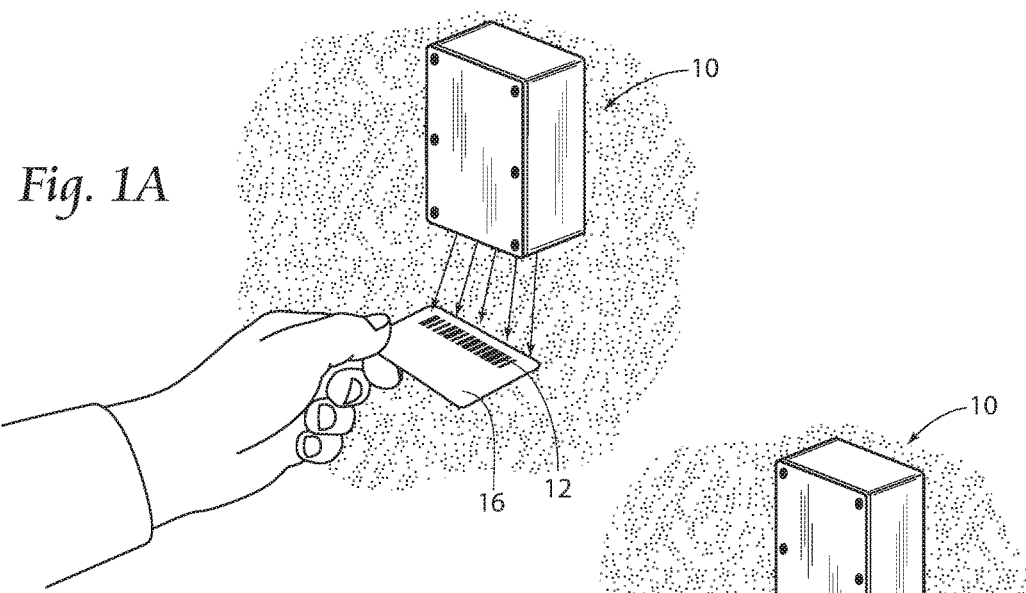
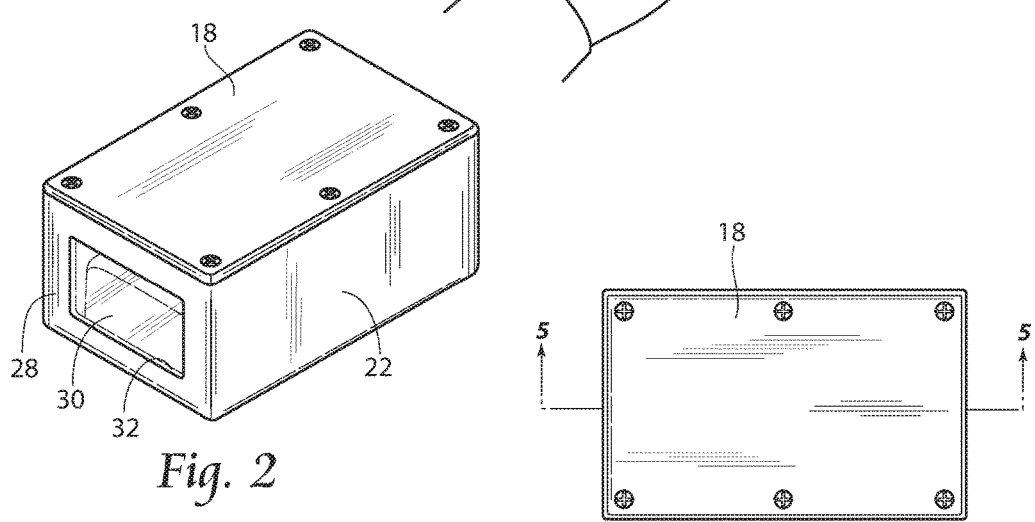

OUTDOOR SCANNER ENCLOSURE

BACKGROUND OF THE INVENTION

Unmanned electronic access to buildings, garages, parking lots, etc. has previously been accomplished by way of RFID, print recognition, magnetic stripe, and the like. Barcode reading from a mobile device has been used in airports and retail stores, but suitable barcode readers for outdoor applications such as those listed above are not available.

Barcode readers are, standing alone, relatively delicate. An outdoor barcode reader therefore must be contained to prevent the ingress of water and particulates in the air, as well as being able to withstand extreme temperatures. Furthermore, in the context of reading barcodes displayed on mobile devices, it is necessary that the barcode reader accommodate the size, shape, and orientation of numerous mobile device models.

SUMMARY OF THE INVENTION

The present invention is directed to an outdoor scanner enclosure that protects a barcode reader from the elements. It is also directed to an outdoor scanner enclosure designed for reading barcodes presented on mobile devices of different configurations.

In addition to weather resistance and the ability to accept information from multiple mobile devices and screen orientations, the present invention also addresses prior art deficiencies by providing a small form factor, RS-232 or USB connectivity options, and the ability to read numerous 2D or 1D barcode symbologies including Code 39, Code 128, Data Matrix, and QR Code.

Use of the device is also envisioned with emergent and future technologies. For example, near-field communication (NFC) allows mobile devices to share data with other NFC-equipped devices. NFC devices have a communication range of 0.75"-4" between devices, a range similar to some barcode scanners. Besides functioning as a mode of access, NFC technology can serve as a payment mechanism. NFC may also be used exclusively for such purposes and/or for other purposes such as customer engagement information by the transfer of data between two NFC-enabled devices.

BRIEF DESCRIPTION OF THE DRAWINGS

FIG. 1A depicts an embodiment of the present invention in use with a first access medium;

FIG. 1B depicts an embodiment of the present invention in use with a second access medium;

FIG. 2 is a perspective view of an embodiment of the invention;

FIG. 2A is a top view of the device shown in FIG. 2;

DESCRIPTION OF THE PREFERRED EMBODIMENT

Figure 2B:
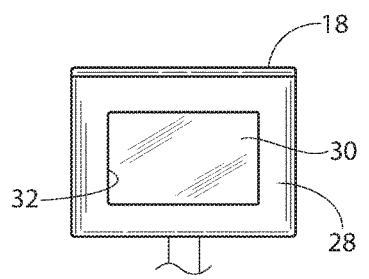
FIG. 2B is a front view of the device shown in FIG. 2.
Figure 2C:
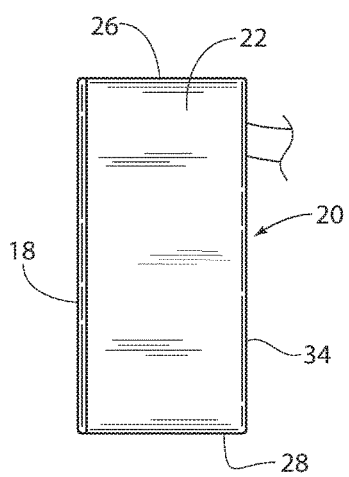
FIG. 2C is a side view of the device shown in FIG. 2.

As seen in FIGS. 1A and 1B, a preferred embodiment of the present invention consists of a scanner enclosure 10 to which a user may present a barcode 12 or other identification representations. Code 12 may be displayed on the user's mobile device 14 or on another suitable medium such as an access card 16. Code 12 is presented to enclosure 10 for access to a restricted location such as a private garage or gated entrance.

Referring to FIGS. 2, 2A, 2B, and 2C, it can be seen that enclosure 10 is preferably generally box shaped, having a lid 18, a rear panel 20, sides 22 and 24, a top end 26, and a window end 28. Window end 28 bears a window 30 and window opening 32, and as better seen in FIGS. 4A and 4B, rear panel 20 has an exterior side 34 and interior aspect 36 through which a cable exit 38 is situated.

Figure 3A:
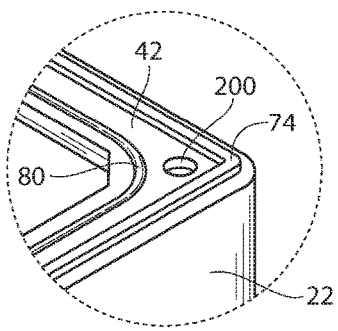
FIG. 3A is close-up view of FIG. 3 taken from section 3A.
Figure 3:
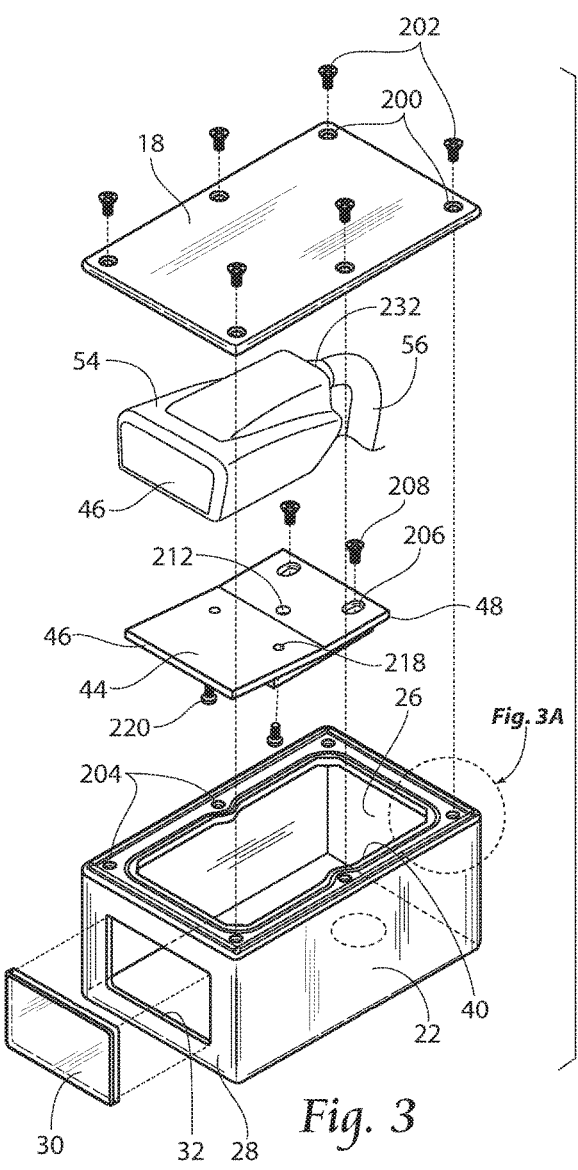
FIG. 3 is an exploded perspective view of an embodiment of the present invention.

FIG. 3 is an exploded view of enclosure 10 showing that it includes a lid opening 40, a lid retention surface 42, a mounting plate 44, and a scanning device 54. Scanning device 54 has a connection cable 56. Mounting plate 44 also has openings 218 and screws 220 for attaching scanning device 54 to mounting plate 44.

Lid opening 40 allows access to the interior of enclosure 10 for construction and repair purposes, while lid retention surface 42 is designed to cooperate with lid 18 to prevent ingress of materials deleterious to scanning device 54. As such, lid 18 has an interior surface 50 with certain elements corresponding to elements of retention surface 42.

Figure 5:
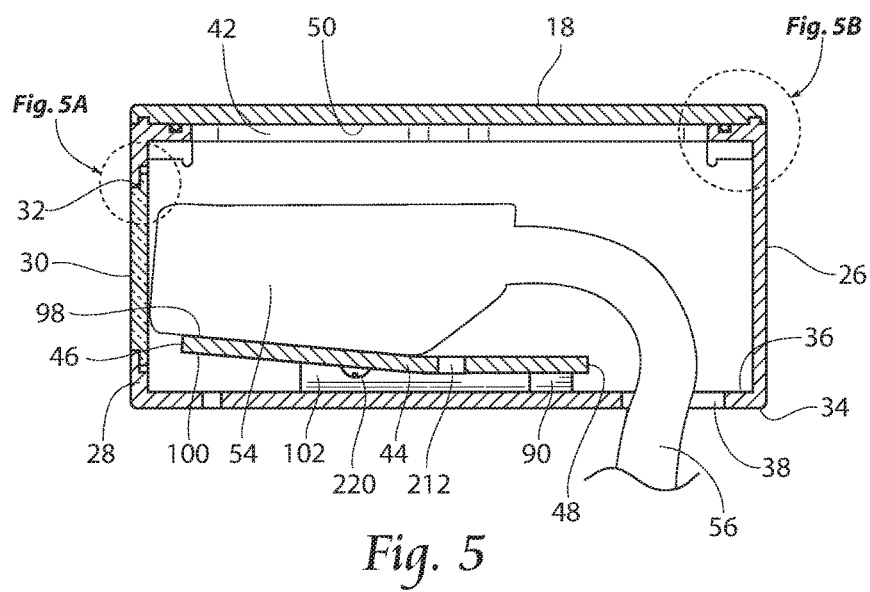
FIG. 5 is a side cutaway view of the device shown in FIG. 2.
Figure 5A:
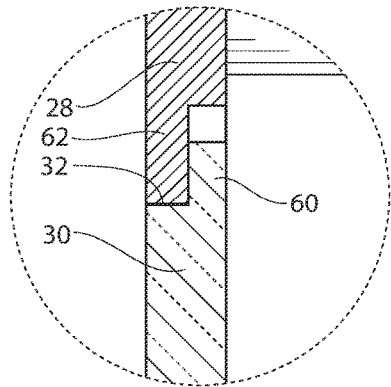
FIG. 5A is a close-up view or FIG. 5 taken from section 5A.

Referring now to FIG. 5 and especially to the portion of FIG. 5 called out as FIG. 5A, window 30 and window opening 32 are shown in closer detail. It can be seen that window 30 is flush with window end 28, preferably on both the interior and exterior of window 30. However, to prevent the external environment from damaging scanning device 54, window 30 is surrounded by a flange 60 that mates with a corresponding lip 62 surrounding window opening 32. FIGS. 5 and 5A illustrate such a preferred embodiment.

Note that although window 30 is shown seated in window opening 32 from within enclosure 10, the reverse arrangement could be employed. Further, corresponding elements other than a flange-flange connection are envisioned. The currently preferred material for window 30 is acrylic due to its durability and low cost, but any material through which an interior scanning device is effective to scan an exterior code is appropriate. Window 30 may be sealed within opening 32 by way of a press fit, an adhesive, or any other suitable means.

Figure 5B:
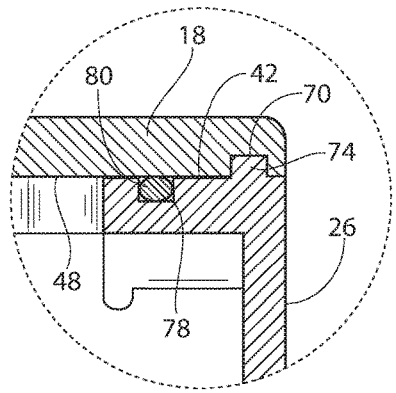
FIG. 5B is a close-up view of FIG. 5 taken from section 5B.

FIG. 5 also elucidates the relationship between lid 18 and lid retention surface 42, which is detailed in FIG. 5B. Lid interior surface 50 has a recess 70 surrounding its perimeter 72, and recess 70 is preferably located at least somewhat interior to perimeter. Similarly, lid retention surface 42 has a protection 74 surrounding its perimeter, projection 74 being sized to mate with recess 70. This recess/projection arrangement provides a first line of defense against environmental contaminants entering enclosure 10.

In a second line of defense, lid retention surface 42 is also provided with a recess 78 located interiorly of projection 74. Recess 78 is fitted with a gasket 80 for sealing against lid interior surface 50. Gasket 80 is preferably constructed of rubber or plastic or another material suitable for a robust sealing relationship between enclosure 10 and lid 18. Gasket 80 may be installed in recess 78 by way of a press fit, adhesive, or any other suitable means or combination of means.

FIG. 5 also shows a side cutaway view of mounting plate 44 seated on rear panel interior 36 by way of attachment portion 90. As can be seen, mounting plate 44 has a forward end 46 adjacent to window 28 and a rearward end 48 adjacent to top end 26. is formed such that at portion 90 it is substantially parallel to rear panel 36, is bent at a transition point located between portion 90 and FIG. 5 further illustrates the position of scanning device 54 relative to window 30.

Figure 7A:
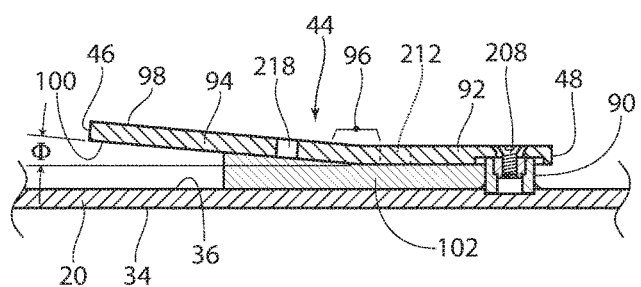
FIG. 7A is a side cutaway view of an embodiment of the mounting plate of the device attached to the rear panel.

As most clearly illustrated in FIG. 7A, attachment portion 90 connects with mounting plate 44 is a close-up of mounting plate 44 and especially of angled segment 94. Specifically, the angle of segment 94 can be between 4 and 12 degrees but is more preferably in the range of between 6 and 9 degrees as shown.

Figure 7B:
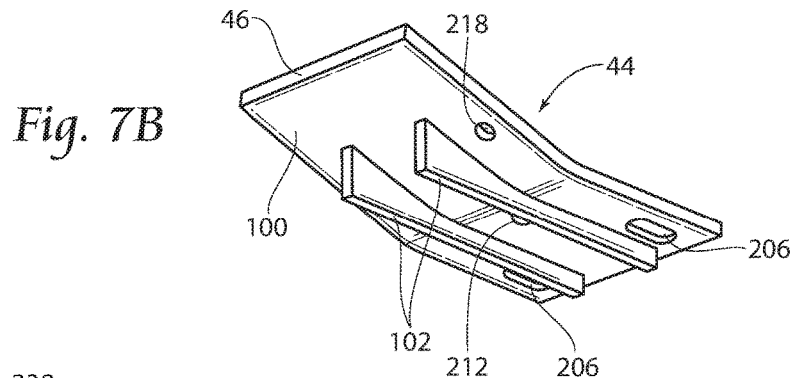
FIG. 7B is a perspective view of the mounting plate shown in FIG. 7A taken from bottom side.

FIG. 7B shows the bottom aspect of mounting plate 44, which has a top surface 98 supporting scanning device 54 (as seen in FIG. 5) and a bottom surface 100 supported by legs 102. Support legs 102 correspond to the contour of mounting plate 44 such that legs 102 have a flat portion 104 supporting parallel segment 92, an inclined portion 106 supporting angled segment 94, an a transition portion 108 corresponding to transition portion 96 of mounting plate 44.

Figure 6:
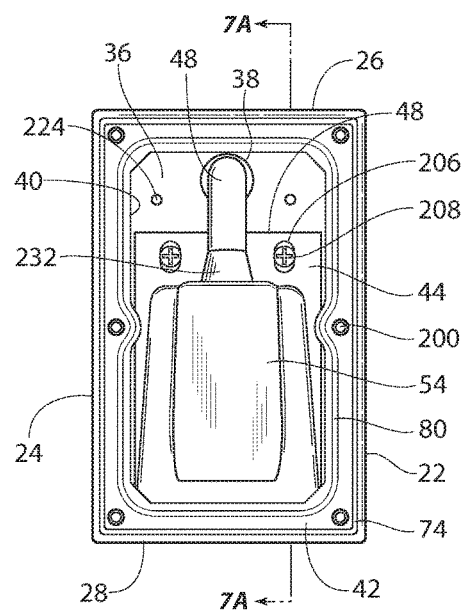
FIG. 6 is a top view of FIG. 4A including the internal parts.
Figure 7C:
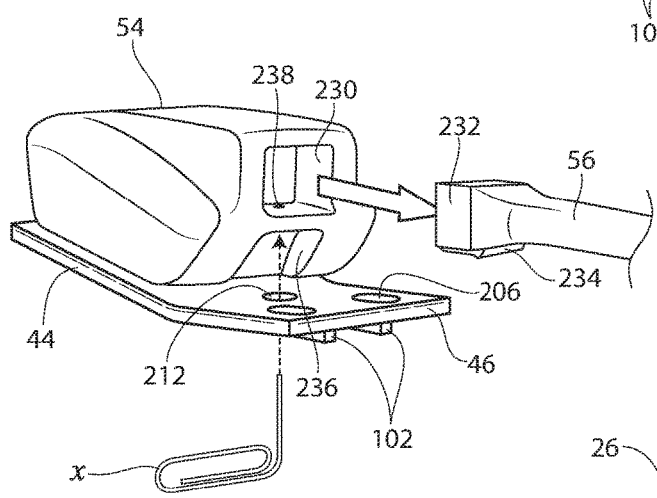
FIG. 7C is a perspective view showing the scanning device attached to the mounting plate and detail of an embodiment of the scanning device detailing removal of the cable.

FIG. 7C provides greater detail of an embodiment of scanning device 54 and corresponding cable 56 in connection with mounting plate 44. As can be seen, mounting plate 44 bears openings 206 and screws 208 (shown in FIGS. 3 and 6) that extend into openings 210 of attachment portion 90 (shown in FIGS. 4A and 7A). Mounting plate 44 additionally bears a cable removal opening 212 through which. a removal device X can be inserted. Removal device X could be a paperclip or the like, or could be a device particularly designed to be inserted into opening 212.

Scanning device 54 is provided. with a cable port 230 into which a connection plug 232 of cable 56 can be inserted. Plug 232 is releasably retained within port 230 by way of a tab 234.

Scanning device 54, in one embodiment, is additionally provided with a cable access cavity 236 having a removal aperture 238 extending into cable port 230. Thus, when plug 232 is seated within port. 203, removal device X can reach through removal aperture 238 to depress tab 234 and allow removal of cable plug 232 from port 230.

Advantageously, this permits the user to remove cable 56 from scanning device 54 without having to remove scanning device 54 from mounting plate 44. In addition to saving time, this removal method ensures that scanner 46 remains properly mounted to plate 44.

In some cases, as for example if mounting plate 44 has been mounted to rear panel 34/36, it will be necessary to remove mounting plate 44 from enclosure 10 by removing screws 208.

Figure 8:
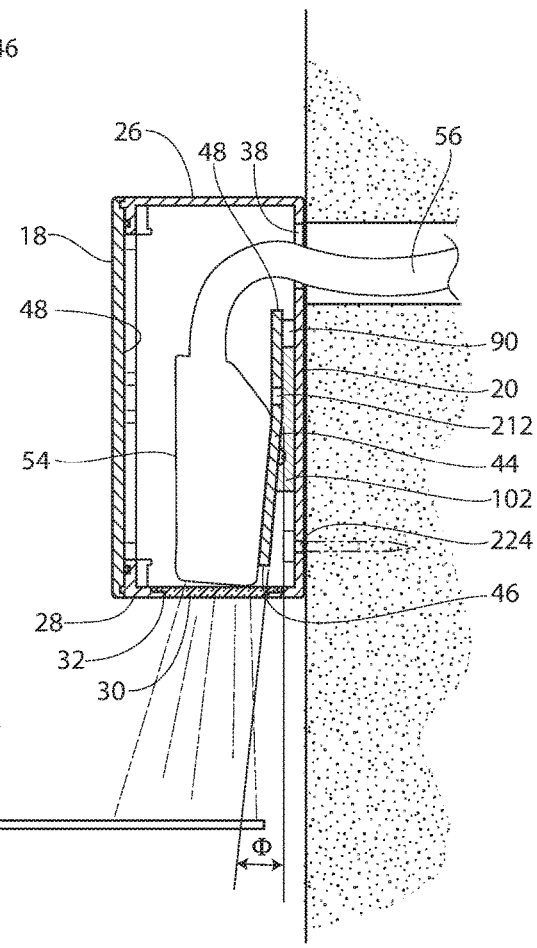
FIG. 8 is a cutaway side view of an embodiment of the present invention mounted to an access substrate.

FIG. 8 illustrates an advantage of the invention in that enclosure 10 permits scanning device 54 to barcodes or other scannable codes 12 at an angle having its focus angled away from the substrate on which it is mounted. This permits a user with a mobile device 14, for example, to present a code 12 to scanning device 54 without rotating device 14 or attempting to orient code 12 closer to the substrate in order to reach an operable scanning angle.

In the embodiments shown, a number of attachments and attachment openings are provided throughout enclosure 10, many of which are shown in FIG. 5. For example, lid 18 bears openings 200 for accepting screws 202, which further extend into openings 204 of lid retention surface 42.

Naturally the number of openings 200 and corresponding screws 202 is variable, but six openings 200 and related screws 202 are presently considered the best mode for weather resistant attachment of lid 18 to surface 42.

Figure 4A:
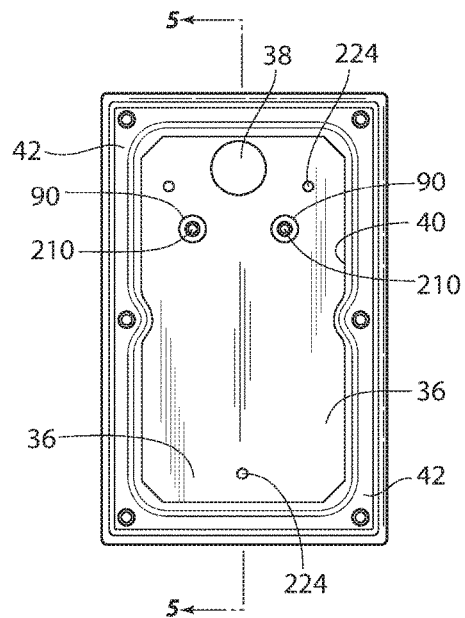
FIG. 4A is a top view of the device shown in FIG. 2 shown without the lid and without the internal parts.
Figure 4B:
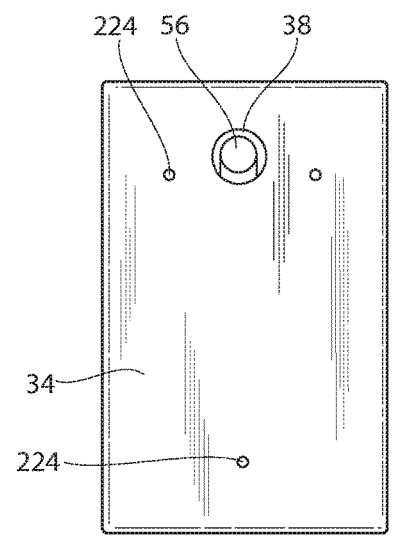
FIG. 4B is a view of rear panel of the device shown in FIG. 2.

As best seen in FIGS. 4A and 4B, enclosure attachment openings 224 in rear panel 20 permit attachment of enclosure 10 to an access substrate such as a garage or office building.

Enclosure 10 is sized to be approximately 4.75×2.25×3 inches, though of course other dimensions are equally acceptable dependent on the size of reader 44 to be enclosed and other variables. In addition, it should be clear to a person of skill in the art that the attachment portions and other elements of the embodiments shown herein, including the overall configuration of the device, can be varied without departing from the inventive aspects thereof.

I claim:

1. An enclosure an identification code reader comprising:
   an enclosure body having a window;
   an identification code reader seated within said enclosure body;
   a mounting bracket for mounting said code reader within said body, wherein said mounting bracket is arranged at an angle relative to said window; and
   a lid and a lid retaining surface, wherein said lid and said lid retaining surface have at least one corresponding structure therebetween to prevent the ingress of substances outside said enclosure, wherein said corresponding structure comprises a gasket and a gasket receiving channel.

2. The enclosure of claim 1, wherein said corresponding structure comprises a projection and a projection receiving recess.

3. The enclosure of claim 1, further comprising a window opening in said body for retaining said window, wherein said window opening is configured to prevent the ingress of substances from outside said enclosure, and wherein said window includes a flange and said window opening includes a lip for retaining said flange.

* * * * *

UNITED STATES PATENT AND TRADEMARK OFFICE
CERTIFICATE OF CORRECTION

| | | |
|---|---|---|
| PATENT NO. | : 10,268,856 B1 | Page 1 of 1 |
| APPLICATION NO. | : 15/950662 | |
| DATED | : April 23, 2019 | |
| INVENTOR(S) | : Gary A. Jahnke | |

It is certified that error appears in the above-identified patent and that said Letters Patent is hereby corrected as shown below:

In the Claims

Column 4, Claim 1, Line 38:
"An enclosure an..." should read --An enclosure for an...--

Signed and Sealed this
Fifth Day of May, 2020

Andrei Iancu
*Director of the United States Patent and Trademark Office*